United States Patent [19]

Kadel

[11] Patent Number: 4,995,484
[45] Date of Patent: Feb. 26, 1991

[54] BRAKE DISCS OR BRAKE DRUMS

[75] Inventor: Karl Kadel, Weinstadt, Fed. Rep. of Germany

[73] Assignee: Daimler-Benz AG, Fed. Rep. of Germany

[21] Appl. No.: 386,235

[22] Filed: Jul. 28, 1989

[30] Foreign Application Priority Data

Jul. 30, 1988 [DE] Fed. Rep. of Germany ....... 3826063

[51] Int. Cl.⁵ .................... C23F 15/00; F16D 65/12
[52] U.S. Cl. ............................ 188/218 R; 188/73.1;
        188/70 R; 188/218 XL; 188/250 R
[58] Field of Search ........ 188/218 XL, 218 R, 250 E,
        188/250 A, 250 R, 250 B, 250 G, 251 R, 251 A,
        251 M, 73.1, 73.2, 70 R, 70 B; 192/107; 427/11

[56] References Cited

U.S. PATENT DOCUMENTS

| | | | |
|---|---|---|---|
| 3,051,271 | 8/1962 | Spannagel et al. | 188/70 R X |
| 3,553,007 | 1/1971 | Hennig | 188/250 R |
| 3,918,555 | 11/1975 | Rath | 188/250 R X |
| 4,008,789 | 2/1977 | Clemmons | 188/70 R |
| 4,155,432 | 5/1979 | Krause | 188/218 X |

Primary Examiner—Douglas C. Butler
Attorney, Agent, or Firm—Evenson, Wands, Edwards, Lenahan & McKeown

[57] ABSTRACT

The invention relates to a brake disc or brake drum or else the combination of both. The brake discs are provided with rotationally symmetrical braking areas and a removable, anti-corrosive coating. The coating completely covers the surface of the brake disc. Between the coating and the braking area there is applied a peelable, adhesive piece which is cut to size from a sheet material and completely covers the braking area.

11 Claims, 2 Drawing Sheets

BRAKE DISCS OR BRAKE DRUMS

BACKGROUND AND SUMMARY OF THE INVENTION

The invention relates to brake discs or brake drums, or else the combination of both, of the type provided with rotationally symmetrical braking areas.

As spare parts, brake discs or brake drums, or else the combination of both, has so far not only been protected mechanically for transport and/or storage by packing in wooden containers and cardboard boxes but also passivated by an anti-corrosive paint. Such a coating guarantees protection against rust, but removal of the paint before fitting is time-intensive and, due to the solvents used for this purpose, also a considerable environmental hazard. Both have the effect of increasing costs.

An object of the invention is to improve the anti-corrosive coating to the extent that it becomes environmentally less harmful and quicker and easier to remove.

This object is achieved according to the invention by providing a covering in the form of at least one peelable piece cut to size and completely covering the braking surface area. The anti-corrosive coating is quickly removed mechanically by peeling off the sheet material, that is, without solvents. Furthermore, this peelable coating provides an additional mechanical protection of the braking areas against scratches or the like.

These and other objects, features and advantages of the present invention will become more apparent from the following description when taken in connection with the accompanying drawing which shows, for purposes of illustration only, one embodiment in accordance with the present invention, and wherein:

DETAILED DESCRIPTION OF THE DRAWINGS

Figure 1:
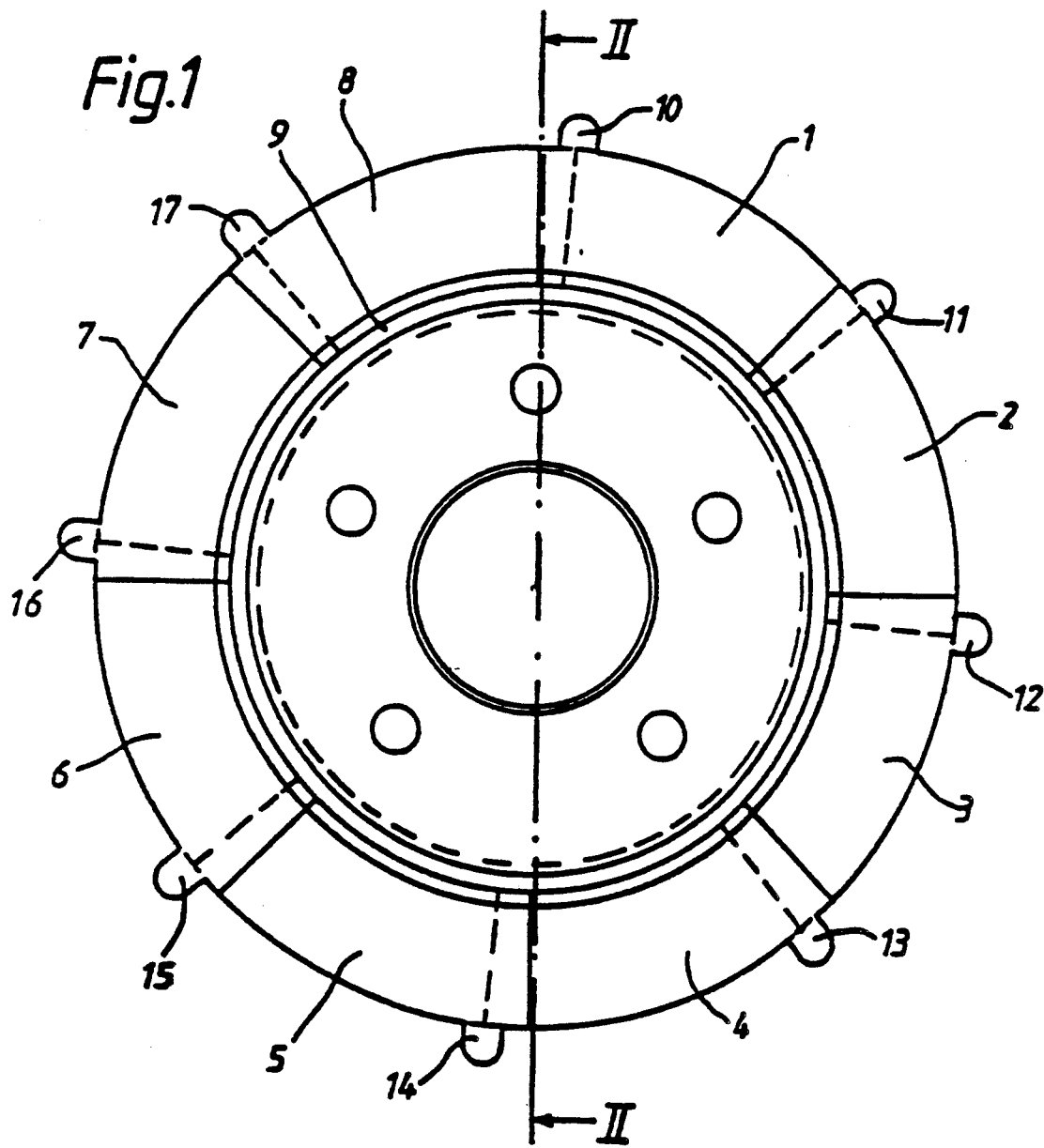
FIG. 1 shows a brake disc with integrated brake drum with covered braking areas.
Figure 2:
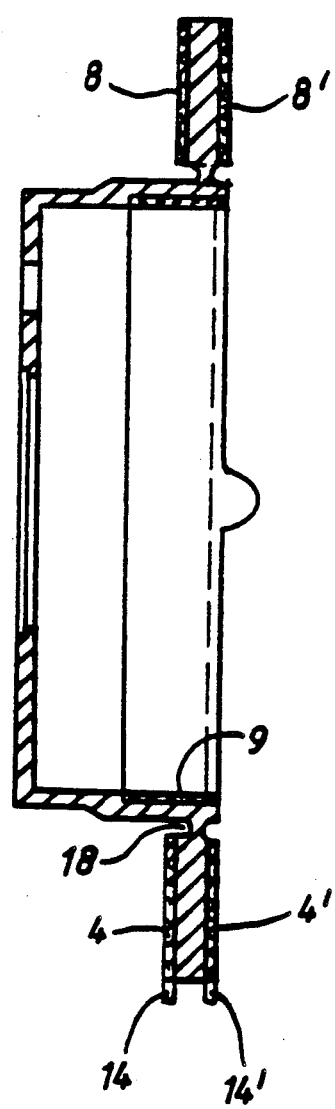
FIG. 2 shows the section through FIG. 1 along the line II—II.

The exemplary embodiment represented in the figures is a brake disc with combined, inner brake drum for the parking brake. The braking area of the brake disc is in this case covered with a stable film, which adheres on the contact side. The film itself is subdivided into annular segment-shaped sectors 1-8; 1'-8'. The inner braking area of the integrated brake drum is covered in a similar way with a film 9, which may, however, be designated as a continuous strip. Once the braking areas are covered with the peelable film, the complete article is subsequently coated with a protective layer, in the present case paint.

Attached to the individual sectors 1-8; 1'-8' are tongues 10-17; 10'-17', which serve for better handling when peeling off the sectors 1-8; 1'-8' of the peelable film. As evident from the figures, only the paint in the region of the braking areas is removed during peeling off of the sectors; the protective layer which is applied to the other zones remains however on the workpiece. As a result, the zones also continue to be protected against access by oxygen and thus against oxidation. This applies in particular to the corrosion-susceptible thermal insulation groove 18 between the axially vertical brake disc part and the cylindrical part of the workpiece. Now that easy removability of the paint by means of solvent is no longer a problem—the paint used here can be adapted in a particular way with respect to place of application, composition and paint adjustment—the paint can now be optimized with regard to corrosion resistance.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed:

1. Spare part element, comprising at least one of a brake disc and a brake drum which are provided with rotationally symmetrical braking surface areas, wherein, in a braking surface region of the braking surface areas, there is adhered to the braking areas at least one peelable piece cut to size from a sheet of material and completely covering the braking surface area, said peelable piece having an anti-corrosive coating applied thereto so as to cover completely said spare part element.

2. The spare part element according to claim 1, wherein the sheet material is a polyethylene film.

3. The spare part element according to claim 1, wherein the sheet material is provided with a self-adhesive layer.

4. The spare part element according to claim 1, wherein the at least one peelable piece includes a cover for axially vertical, plane braking areas, said cover being composed of a plurality of cut-to-size pieces shaped in the form of circular ring sectors.

5. The spare part element according to claim 4, wherein the cover, or the cut-to-size pieces project at the outer rim.

6. The spare part element according to claim 5, wherein the projection is designed as a tongue which can be manually grasped to remove the cut-to-size pieces from the braking surface.

7. The spare part element according to claim 4, wherein the cut-to-size pieces overlap in joint regions.

8. The spare part element according to claim 1, wherein the anti-corrosive coating consists of heat-resistant paint, in particular of a nitro-based paint.

9. The spare part element according to claim 2, wherein the sheet material is provided with a self-adhesive layer.

10. The spare part element according to claim 6, wherein the sheet material is provided with a self-adhesive layer.

11. The spare part element according to claim 8, wherein the sheet material is provided with a self-adhesive layer.

* * * * *